United States Patent Office 3,005,694
Patented Oct. 24, 1961

3,005,694
2,3,5,6-TETRACHLOROBENZOIC ACID AND SALTS THEREOF AND HERBICIDAL METHOD EMPLOYING SAME
Charles E. Entemann, Painesville, Ohio, assignor, by mesne assignments, to E. I. du Pont de Nemours and Company, Wilmington, Del., a corporation of Delaware
No Drawing. Filed June 23, 1958, Ser. No. 743,978
5 Claims. (Cl. 71—2.6)

This invention relates to 2,3,5,6-tetrachlorobenzoic acid.

This application is a continuation-in-part of my application Serial No. 434,657, filed June 4, 1954, entitled Chemical Composition and Method, now abandoned.

It has been found that 2,3,5,6-tetrachlorobenzoic acid possesses a unique kind of herbicidal activity that is not possessed by the polychlorobenzoates previously used or suggested as herbicides. Not only does this compound possess an extremely high overall level of herbicidal activity so that it kills most common weeds at very low dosages, but furthermore it has been fonud that this compound will kill woody perennial plants such as willow and privet. Additionally, this compound can be used effectively for soil sterilization in view of its extremely long residual action. In contrast, the prior art chlorobenzoates, such as the alkyl esters of polychlorobenzoic acids, are known to be completely ineffective for the control of woody perennials, and unsuitable for soil sterilization usage.

In using 2,3,5,6-tetrachlorobenzoic acid as a herbicide, it can be applied as such or it can be applied in the form of a compound that under use conditions yields 2,3,5,6-tetrachlorobenzoic acid. Thus, it can be applied as a hydrolyzable salt that will yield the acid on contact with soil or plant moisture, as is well known in the art with respect to organic acid herbicides. Accordingly, any of the water-soluble metal, ammonium and amine salts are obvious equivalents of the acid itself.

While all of the metal, ammonium and substituted ammonium carboxy salts of these tetrachlorobenzoic acids are very effective, by far the best are the alkali and alkaline earth metal, ammonium, and mono-, di- and tri-alkyl and alkanol amine salts, with the alkyl and alkanol substituents preferably containing less than 6 carbon atoms.

The compound of this invention can be prepared from 2,3,5,6-tetrachlorotoluene (isolated from the chlorination of toluene or toluene-p-sulfonyl chloride) by further chlorination of the side chain methyl group at elevated temperatures in the presence of ultraviolet light. This procedure gives 2,3,5,6-tetrachlorobenzaldichloride in good yield. The corresponding aldehyde 2,3,5,6-tetrachlorobenzaldehyde is obtained by hydrolyzing this chlorinated benzal dichloride with sulfuric acid. Essentially pure 2,3,5,6-tetrachlorobenzoic acid can be obtained by oxidizing the aldehyde with, for example, dilute nitric acid or by direct phosgenation (in the presence of aluminum trichloride) of 1,2,4,5-tetrachlorobenzene.

In use, 2,3,5,6-tetrachlorobenzoic acid and its salts are extended with a liquid or solid diluent. Those compounds that are sufficiently water-soluble, such as the alkali metal, ammonium and amine salts of 2,3,5,6-tetrachlorobenzoic acid, can be formulated into sprayable compositions by diluting them with water. Alternatively, these compounds can be formulated into herbicidal compositions by admixing the active ingredient in a herbicidally effective amount, with a conditioning agent of the kind used and referred to in the art as a pest control adjuvant or modifier to provide formulations adapted for ready and efficient application to soil or weeds, that is, unwanted plants, using conventional applicator equipment.

The herbicidal compositions are prepared in the form of solids or liquids. Solid compositions are preferably in the form of wettable powders and are compounded to give homoeneous free-flowing powders by admixing the active ingredient with finely divided solids, preferably natural clays, diatomaceous earth, synthetic fine silica, or flours, such as walnut shell, wheat, redwood, soya bean, cotton seed flours and other inert solid conditioning agents or carriers of the kind conventionally employed in preparing pest control compositions in solid or liquid form.

Even more preferable among solid compositions are granules or pellets when the application is primarily to the soil. Granules may be prepared by impregnating granular diluents such as granular attaclay or may be made by first extending powdered solid with powdered diluent and subsequently granulating. Pellets are made by extruding moistened, powdered mixtures under high pressure through dies.

Liquid compositions of the invention are prepared in the usual way by mixing the active ingredient with a suitable liquid diluent medium. The resulting composition can be in the form of either a solution or suspension of the active ingredient.

The herbicidal compositions of the invention, whether in the form of solids or liquids preferably also include a surface-active agent of the kind sometimes referred to in the art as a wetting, dispersing or emulsifying agent. These agents which will be referred to hereinafter more simply as surface-active agents cause the compositions to be easily dispersed in water to give aqueous sprays which for the most part constitute a desirable composition for application.

The surface-active agents employed can be of the anionic, cationic or nonionic type and include, for example, sodium and potassium oleate, the amine salts of oleic acids such as morpholine and dimethylamine oleates, the sulfonated animal and vegetable oils such as sulfonated fish and castor oils, sulfonated petroleum oils, sulfonated acyclic hydrocarbons, sodium salt of lignin sulfonic acid (goulac), alkyl naphthalene sodium sulfonate and other wetting, dispersing and emulsifying agents such as those listed in articles by McCutcheon in "Soap and Chemical Specialties," volume 31, Nos. 7–10 (1955).

Generally the surface-active agent will not comprise more than about 5 to 15% by weight of the composition depending, of course, upon the particular surface-active agent, the system in which it is placed, and the result desired, and in certain compositions, the percentage will be 1% or less. Usually the minimum lower concentration will be 0.1%.

The herbicidal compositions are applied either as a spray, a granule or as a dust to the locus or area to be protected from undesirable plant growth, commonly called weeds, i.e., plants growing where they are not wanted. Such application can be made directly upon the locus or area and the weeds thereon during the period of weed infestation in order to destroy the weeds, but if desired the application can be made in advance of an anticipated weed infestation to prevent such infestation. Thus the compositions can be applied as aqueous foliar sprays, but can also be applied as sprays or as granules directly to the surface of the soil. Alternatively, the dried powdered compositions can be dusted directly on the plants or on the soil.

The active compound is, of course, applied in amount sufficient to exert the desired herbicidal action. The amount of the active ingredient present in the compositions as actually applied for destroying, preventing or controlling weeds will vary with the manner of application, the particular weeds for which control is sought, the purposes for which the application is being made, and like variables. In general, the herbicidal compositions as applied in the form of a spray or a granule will contain from about 0.5% to 85% by weight of the active ingredient.

Fertilizer materials, other herbicidal agents, and other pest control agents such as insecticides and fungicides can be included in the herbicidal compositions of the invention if desired.

In order that the invention may be better understood, the following examples are given in addition to the examples already given above. The examples illustrate the preparation of the active ingredient herbicidal formulations employing the compound, herbicidal applications, and the results obtained. Parts are by weight unless otherwise specified and the numbers following tabulated ingredients in the examples represent parts by weight of the ingredients in the combination shown in such tabulation.

COMPOUND PREPARATIONS

Example 1.—2,3,5,6-tetrachlorobenzoic acid

Into a 500 ml. 3-necked flask equipped with a gas inlet tube, thermometer, stirrer, and reflux condenser are introduced 216 g. of 1,2,4,5-tetrachlorobenzene and 300 g. of anhydrous powdered aluminum chloride. This mixture is heated with stirring until a fluid suspension is obtained at 155° C. 82 g. of phosgene is then passed into the mixture with continuous stirring over a period of about 3 hours while the suspension is maintained at a temperature of 175° C.

The reaction mixture obtained on phosgenation is hydrolyzed by adding it to warm 1:1 hydrochloric acid, and ice as needed to prevent boiling. The resulting slurry is filtered and the filter cake washed with water until the filtrate first appears turbid. The wet filter cake is then heated with 600 ml. of 5% sodium carbonate solution, cooled, and filtered and the residue washed with water until the filtrate is neutral.

The filtrate and washings from the foregoing steps are stirred into 100 ml. of concentrated hydrochloric acid and a small quantity of ice. The resulting white precipitate is filtered, washed with water, and dried to produce a product weighting 44.5 g.

The crude tetrachlorobenzoic acid is dissolved in 300 ml. of hot toluene, boiled with a small amount of charcoal, and filtered. The filtrate is then cooled in ice to produce a white 2,3,5,6-tetrachlorobenzoic acid which, after filtering and drying, weighs 40.5 g., has a melting point of 181.5°–182.0° C. and a neutral equivalent of 258.

Example 2.—2,3,5,6-tetrachlorobenzoic acid, sodium salt

A mixture of 24.4 parts of 2,3,5,6-tetrachlorobenzoic acid in 100 parts of water is treated with 5.3 parts of anhydrous sodium hydroxide in small portions. After the reaction subsides, the clear solution is evaporated to dryness on a steam bath in vacuo to yield essentially pure 2,3,5,6-tetrachlorobenzoic acid, sodium salt.

The following metal salts are prepared in accordance with this procedure by substituting for the sodium hydroxide molecular equivalent amounts of the hydroxides of the metal ions of the following compounds:

2,3,5,6-tetrachlorobenzoic acid, potassium salt
2,3,5,6-tetrachlorobenzoic acid, calcium salt
2,3,5,6-tetrachlorobenzoic acid, barium salt

Example 3.—2,3,5,6-tetrachlorobenzoic acid, dimethylamine salt

Dimethylamine is metered into a well-stirred solution consisting of 150 parts by weight of ethanol and 30 parts by weight of 2,3,5,6-tetrachlorobenzoic acid in a flask fitted with a reflux condenser. The addition of the amine is discontinued when a test paper held above the surface of the solution shows an alkaline reaction. The ethanol and slight excess of dimethylamine are removed by distillation. The residue consists of essentially pure 2,3,5,6-tetrachlorobenzoic acid, dimethylamine salt.

In accordance with this synthesis, amine salts of 2,3,5,6-tetrachlorobenzoic acid with ammonia, monomethylamine, trimethylamine, monoethylamine, diethylamine, triethylamine, monopropylamine, dipropylamine, monobutylamine, diisobutylamine, n-hexylamine, amylamine, methyldiethylamine, methylethylamine, methyldipropylamine, butylisopropylamine, monoethanolamine, isopropanolamine, dimethylisobutanolamine, n-hexanolamine, ethylenediamine and propylenediamine are prepared by substituting molecular equivalent amounts of these amines for the dimethylamine in the above synthesis.

Example 4.—2,3,5,6-tetrachlorobenzoic acid 2,3,5,6-tetrachlorobenzaldehyde (50 parts by weight) is stirred vigorously at 95° C. with 1500 parts by weight of 30% nitric acid until a test portion shows almost complete solubility in dilute aqueous sodium hydroxide. The reaction mixture is then cooled and basified with sodium hydroxide, and the faintly turbid solution clarified by extraction with benzene, treated with carbon, filtered, and gradually acidified with dilute hydrochloric acid with stirring. Essentially pure 2,3,5,6-tetrachlorobenzoic acid precipitates out of solution.

HERBICIDAL UTILITY

Example 5

To demonstrate the effectiveness of 2,3,5,6-tetrachlorobenzoic acid for the control of woody perennial plants, as compared with the ineffectiveness of various other polychlorobenzoic acid compounds, the following series of tests is run. These tests consist of applying the test compound as a foliar spray to established willow and privet plants. The willow plants are treated at a dosage of 35 lbs./acre and the privet plants are treated at a dosage of 50 lbs./acre.

TABLE I

| No. | Benzoic Acid Test Compound | Injury Rating | |
|---|---|---|---|
| | | Willow | Privet |
| 1 | 2,3,5,6-tetrachloro | excellent control | excellent control. |
| 2 | 2,3,5,6-tetrachloro dimethylamine salt. | do | Do. |
| 3 | 2,3,5,6-tetrachloro, methyl ester. | no kill | no kill. |
| 4 | 2,3,6-trichloro, methyl ester. | do | Do. |
| 5 | 2,3,4,5-tetrachloro | do | Do. |
| 6 | 2,3,5-triiodo | do | Do. |
| 7 | 2,5-dichloro | do | Do. |
| 8 | Check | do | Do. |

Compounds 1 and 2 of the present invention are extremely effective for the control of typical woody perennial plants. In contrast, the various other polychlorobenzoic compounds in the above tests are ineffective for this usage. Just why there is this difference in the kind of activity possessed by the 2,3,5,6-tetrachlorobenzoic acids and salts of the present invention as compared with other polychlorobenzoic compounds is not known, although the distinct difference is extremely apparent.

The mechanism by which the compounds of this invention produce their characteristic effects on plants is not completely understood at present. However, it is believed that these compounds act systemically when applied to plants and/or soil, the active material passing into and through the plant and being translocated to adjacent plants wherein the same characteristic effect is obtained.

Example 6

To further demonstrate the herbicidal effectiveness of the compounds of the present invention, a second series of tests is run. These tests consist of applying the test compounds as foliar sprays to established cotton plants at the rate of 10 pounds per acre of active ingredient. Cotton is a hardy dicotyledon plant that is frequently used as an indicator plant for the testing of herbicidal candidates. The following table shows the results of these tests.

TABLE II

| No. | Benzoic Acid Test Compound | Injury Rating [1] |
|---|---|---|
| 9 | 2,3,5,6-tetrachloro | 10 |
| 10 | 2,3,5,6-tetrachloro, dimethylamine salt | 10 |
| 11 | 2,3,5,6-tetrachloro, methyl ester | 1 |
| 12 | 2,3,6-trichloro, methyl ester | 1 |
| 13 | 2,3,4,5-tetrachloro | 1 |
| 14 | 2,3,5-triiodo | 2 |
| 15 | 2,5-dichloro | 3 |
| 16 | Untreated control | 1 |

[1] Injury rating is based on a scale of 0 to 10, in which 0, indicates no injury and 10 indicates that all plants are dead.

As can be seen from the above test data, compounds 9 and 10 of the present invention gave a complete kill of all of the test plants. In contrast, the various other polychlorobenzoic compounds caused substantially no damage to the plants, and what little damage did occur did not result in a kill of any of the plants—all of the test plants would be expected to recover from this damage and mature as normal healthy plants. Thus the compounds of tests 11 to 15 are not considered to be herbicides.

*Example 7*

To further demonstrate the herbicidal effectiveness of the compounds of the present invention, a third series of tests is run. These tests consist of applying the test compounds as foliar sprays to Johnson grass at the rate of 35 lbs./acre of active ingredient. The following table shows the results of these tests.

TABLE III

| No. | Benzoic Acid Test Compound | Injury Rating |
|---|---|---|
| 17 | 2,3,5,6,-tetrachloro | 9 |
| 18 | 2,3,5,6-tetrachloro, dimethylamine salt | 9 |
| 19 | 2,3,5,6-tetrachloro, methyl ester | 1 |
| 20 | 2,3,4,5-tetrachloro | 2 |
| 21 | Untreated control | 0 |

*Example 8*

To demonstrate the effectiveness of the compounds of the present invention as pre-emergent herbicides, a series of tests is run wherein the test compounds are applied at 2 and 5 pounds per acre as sprays to plots that have been seeded with various typical test plants. The following table shows the results of these tests:

TABLE IV

| Test Compound | Rate, Lb./A. | Injury Rating [1] | | | | |
|---|---|---|---|---|---|---|
| | | Carrots | Peas | Mustard | Pigweed | Bermuda Grass |
| 2,3,5,6-tetrachlorobenzoic acid | 5 | 10 | 10 | 10 | 10 | 10 |
| | 2 | 10 | 10 | 10 | 10 | 10 |
| 2,3,5,6-tetrachlorobenzoic acid, methyl ester | 5 | 2 | 1 | 1 | 0 | 2 |
| | 2 | 0 | 0 | 0 | 0 | 0 |

[1] Injury rating is based on scale of 0 to 10, in which 0 indicates no injury and 10 indicates that all plants are dead.

HERBICIDAL COMPOSITIONS

*Example 9*

| | Percent |
|---|---|
| 2,3,5,6-tetrachlorobenzoic acid, Ca salt | 80 |
| Alkyl naphthalene sulfonic acid, Na salt | 2 |
| Low viscosity methyl cellulose | 0.4 |
| Attapulgite clay | 17.6 |

The above components are blended and micropulverized, then reblended to form a free-flowing wettable powder which may be dispersed in water.

This formulation is mixed with 60 gallons of water and applied at the rate of 3 pounds (acid equivalent) per acre with a hand sprayer. Excellent pre-emergence control of germinating annual grasses and broadleaf weeds in corn is obtained.

*Example 10*

| | Percent |
|---|---|
| 2,3,5,6-tetrachlorobenzoic acid | 80 |
| Polyoxyethylene ester of mixed fatty and rosin acids concreted with urea (Renex 25) | 4 |
| Diatomaceous silica | 16 |

The above wettable powder is prepared in the same manner as described for Example 9.

The above formulation is used in the following manner:

(a) To control woody vines such as trumpet vine, honeysuckle and Virginia Creeper at rates of 5 to 15 pounds (acid equivalent) per acre in 150 gallons water per acre.

(b) To control dandelion, plantain, dock, ragweed and annual grasses for an extended period of time at rates of 40 lbs./acre (active) in 150 gallons water per acre.

*Example 11*

| | Percent |
|---|---|
| 2,3,5,6-tetrachlorobenzoic acid, dimethylamine salt | 25 |
| Partially desulfonated sodium lignin sulfonate | 1 |
| Sodium dichromate dihydrate | 0.75 |
| Water | 73.25 |

A concentrated water solution is prepared readily by simple mixing of the above components. It may then be diluted to spray concentration with additional water.

(a) This formulation is applied at the rate of 30 lbs./acre (acid equivalent) in 150 gallons water. Excellent control of field bindweed and Canada thistle is obtained in areas infested with these weeds in agricultural soils.

(b) When used at the rate of 8 pounds of acid equivalent per 100 gallons of water to wet the foliage thoroughly excellent control of red cedar, white pine, sumac, persimmon, black spruce and Balsam fir is killed.

It is to be understood that although the invention has been described with specific reference to particular embodiments thereof, it is not to be so limited, since changes and alterations therein may be made which are within the full intended scope of this invention as defined by the appended claims.

What is claimed is:

1. 2,3,5,6-tetrachlorobenzoic acid and the salts thereof.
2. A method of killing plant growth which comprises treating a plant with a herbicidal dosage of a substance selected from the group consisting of 2,3,5,6-tetrachlorobenzoic acid and the salts thereof.
3. A method of killing plant growth which comprises treating a plant with a dosage of a compound selected from the group consisting of 2,3,5,6-tetrachlorobenzoic acid and the salts thereof, said compound being applied in herbicidal concentration.
4. A method of killing weeds which comprises applying to the locus of the weeds a herbicidal dosage of a compound selected from the group consisting of 2,3,5,6-tetrachlorobenzoic acid and the salts thereof.
5. A composition consisting essentially of a herbicidal amount of a substance selected from the group consisting of 2,3,5,6-tetrachlorobenzoic acid and its salts and a minor but effective amount of a surface-active agent.

(References on following page)

References Cited in the file of this patent

UNITED STATES PATENTS

| | | |
|---|---|---|
| 2,394,916 | Jones | Feb. 12, 1946 |
| 2,726,947 | Baumgartner | Dec. 13, 1955 |
| 2,847,462 | Sieger | Aug. 12, 1958 |
| 2,848,470 | Girard et al. | Aug. 19, 1958 |
| 2,890,243 | Brown et al. | June 9, 1959 |

FOREIGN PATENTS

| | | |
|---|---|---|
| 785,989 | Great Britain | Nov. 6, 1957 |
| 860,639 | Germany | Dec. 22, 1952 |

OTHER REFERENCES

Gilbert in "Chemical Reviews," October 1946, pages 199–211.

Jones et al., in "Biochemical Journal," vol. 48, 1951, pages 422 to 425.

Vengris in "Proc. Northeastern Weed Control Conf.," January 1956, pages 27 to 31.

Metcalf: "Advances in Pest Control Research," page 68, vol. 1, Interscience Publishers, Inc., N.Y.; copyright 1957.

Miller in "Weeds," January 1952, pages 185 to 188.

Zimmerman et al. in "Contributions of Boyce Thompson Institute," January–March 1951, vol. 16, No. 5, pages 209–213.